United States Patent
Zhong et al.

(10) Patent No.: US 10,659,153 B2
(45) Date of Patent: May 19, 2020

(54) METHOD FOR MEASURING DISPERSION COEFFICIENT OF OPTICAL FIBER AND NETWORK DEVICE

(71) Applicant: HUAWEI TECHNOLOGIES CO., LTD, Shenzhen (CN)

(72) Inventors: Jian Zhong, Dongguan (CN); Zhiping Jiang, Ottawa (CA); Rui He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/504,262

(22) Filed: Jul. 6, 2019

(65) Prior Publication Data
US 2019/0334616 A1    Oct. 31, 2019

Related U.S. Application Data

(63) Continuation of application No. PCT/CN2017/070475, filed on Jan. 6, 2017.

(51) Int. Cl.
*H04B 10/077* (2013.01)
*G01M 11/00* (2006.01)
*H04B 10/27* (2013.01)

(52) U.S. Cl.
CPC ......... *H04B 10/0775* (2013.01); *G01M 11/30* (2013.01); *H04B 10/0773* (2013.01); *H04B 10/27* (2013.01)

(58) Field of Classification Search
CPC ............. G01M 11/3163; G01M 11/30; G01M 11/3127; H04B 10/07; H04B 10/0773; H04B 10/0775; H04B 10/27
See application file for complete search history.

(56) References Cited

U.S. PATENT DOCUMENTS

| | | | |
|---|---|---|---|
| 5,619,321 A | 4/1997 | Artiglia et al. | |
| 6,765,659 B1 * | 7/2004 | Bhatnagar | G01M 11/338 356/73.1 |

(Continued)

FOREIGN PATENT DOCUMENTS

| | | |
|---|---|---|
| CN | 1447554 A | 10/2003 |
| CN | 101819086 A | 9/2010 |

(Continued)

OTHER PUBLICATIONS

"ITU-T G.652, Series G: Transmission Systems and Media, Digital Systems and Networks Transmission media and optical systems characteristics—Optical fibre cables Characteristics of a single-mode optical fibre and cable, Nov. 2016, 28 pages".

(Continued)

*Primary Examiner* — Mina M Shalaby
(74) *Attorney, Agent, or Firm* — Kilpatrick Townsend & Stockton LLP

(57) ABSTRACT

The application provides a method for measuring a dispersion coefficient of an optical fiber. A network device sends a first optical supervisory channel (OSC) measurement signal and a second OSC measurement signal, where wavelengths of the first OSC measurement signal and the second OSC measurement signal are different. The network device receives the returned first OSC measurement signal and second OSC measurement signal, where the first OSC measurement signal and the second OSC measurement signal are transmitted through a first optical fiber and a second optical fiber to return to the network device, and the first optical fiber and the second optical fiber are a to-be-tested optical fiber. The network device determines a delay difference between the received first OSC measurement signal and second OSC measurement signal. The network (Continued)

device determines a dispersion coefficient of the to-be-tested optical fiber based on the delay difference.

17 Claims, 7 Drawing Sheets

(56) References Cited

U.S. PATENT DOCUMENTS

| | | | |
|---|---|---|---|
| 8,422,888 B2 | 4/2013 | Uekama | |
| 10,211,920 B1* | 2/2019 | Khaleghi | H04B 10/25253 |
| 10,411,796 B1* | 9/2019 | Archambault | H04B 10/0797 |
| 2003/0071985 A1* | 4/2003 | Mori | G01M 11/332 |
| | | | 356/73.1 |
| 2003/0180051 A1 | 9/2003 | Veith et al. | |
| 2004/0208523 A1* | 10/2004 | Carrick | H04B 10/071 |
| | | | 398/32 |
| 2005/0244164 A1* | 11/2005 | Miyashita | H04B 10/25253 |
| | | | 398/147 |
| 2008/0175590 A1* | 7/2008 | Perkins | H04J 14/02 |
| | | | 398/58 |
| 2008/0187323 A1* | 8/2008 | Honda | H04B 10/25133 |
| | | | 398/159 |
| 2009/0196615 A1* | 8/2009 | Kauffman | H04B 10/07951 |
| | | | 398/79 |
| 2009/0238563 A1* | 9/2009 | Fukashiro | H04B 10/0775 |
| | | | 398/30 |
| 2009/0269058 A1* | 10/2009 | Summa | H04B 10/0795 |
| | | | 398/37 |
| 2009/0279890 A1* | 11/2009 | Duan | H04B 10/0775 |
| | | | 398/58 |
| 2009/0297154 A1* | 12/2009 | Izumi | G01M 11/332 |
| | | | 398/81 |
| 2010/0097601 A1* | 4/2010 | Bato | H04B 10/0773 |
| | | | 356/73.1 |
| 2010/0284701 A1* | 11/2010 | Lin | H04B 10/2513 |
| | | | 398/160 |
| 2012/0170928 A1* | 7/2012 | Tanaka | H04B 10/2557 |
| | | | 398/28 |
| 2013/0202291 A1* | 8/2013 | Cavaliere | H04B 10/07 |
| | | | 398/33 |
| 2016/0204876 A1* | 7/2016 | Kamura | H04J 14/0227 |
| | | | 398/34 |
| 2018/0359027 A1* | 12/2018 | Brzozowski | H04B 10/0775 |

FOREIGN PATENT DOCUMENTS

| | | |
|---|---|---|
| CN | 103267743 A | 8/2013 |
| CN | 103957050 A | 7/2014 |
| CN | 205538163 U | 8/2016 |
| JP | H08285729 A | 11/1996 |

OTHER PUBLICATIONS

"ITU-T G.653, Series G: Transmission Systems and Media, Digital Systems and Networks, Transmission media and optical systems characteristics—Optical fibre cables Characteristics of a dispersion-shifted, single-mode optical fibre and cable. Jul. 2010, 22 pages".

"ITU-T G.654, Series G: Transmission Systems and Media, Digital Systems and Networks, Transmission media and optical systems characteristics—Optical fibre cables Characteristics of a cut-off shifted single-mode optical fibre and cable, Nov. 2016, 24 pages".

"ITU-T G.655, Series G: Transmission Systems and Media, Digital Systems and Networks, Transmission media and optical systems characteristics—Optical fibre cables Characteristics of a non-zero dispersion-shifted single-mode optical fibre and cable, Nov. 2009, 26 pages".

* cited by examiner

METHOD FOR MEASURING DISPERSION COEFFICIENT OF OPTICAL FIBER AND NETWORK DEVICE

CROSS-REFERENCE TO RELATED APPLICATIONS

This application is a continuation of International Application No. PCT/CN2017/070475, filed on Jan. 6, 2017, the disclosure of which is hereby incorporated by reference in its entirety.

TECHNICAL FIELD

This application relates to the field of fiber parameter measurement, and in particular, to a method for measuring a dispersion coefficient of an optical fiber and a network device.

BACKGROUND

With continuous development of communications technologies, operators have used optical fibers widely as transmission media in transmission networks to meet people's high requirements for information transmission. An optical fiber transmission network usually includes many spans. Different spans may have different optical fiber types. For example, in a terrestrial wavelength division multiplexing (WDM) transmission system, the most common fibers are a standard single mode fiber (SSMF) and a large effective area fiber (Leaf), which are respectively a G.652 optical fiber and a G.655 optical fiber, and a less common fiber is a dispersion shifted fiber (DSF), which is a G.653 optical fiber. In addition, optical fibers such as a true wave classic (TWC) fiber, a true wave reduced dispersion slope (TWRS) fiber, and a large effective area fiber submarine (LS) are occasionally used. The large effective area fiber submarine is mainly a G.654 optical fiber.

Different types of optical fibers have different core diameters, dispersion coefficients, dispersion slopes, zero-dispersion wavelengths, and the like. As a result, transmission of a WDM system has different nonlinear effects. Nonlinearity is one of the major limitation factors for transmission in the WDM system, and especially, a coherent WDM system. For example, in an 80*100G WDM coherent transmission system, limited by a nonlinear effect, single-wavelength average incident powers are usually: +1 dBm@G.652, −1 dBm@Leaf, and −7 dBm@G.653. As a result, three types of optical fibers support greatly differing transmission distances, which are: 2500 km@G.652, 1600 km@Leaf, and 500 km@G.653. As can be learned, different optical fiber types have significant impact on transmission performance of the WDM system. In phases such as network planning, designing, deployment and commissioning, and operation and maintenance, optical fiber types in all spans need to be accurately known and used as input conditions to ensure working accuracy in these phases.

At present, optical fiber type information is mainly transferred manually in all phases, resulting in low efficiency and occasional errors. Different types of optical fibers have different dispersion coefficients and dispersion slopes. Therefore, a type of an optical fiber may be determined by measuring a dispersion coefficient of the optical fiber. In the prior art, to measure a dispersion coefficient of an optical fiber, staff with meters need to be arranged at both ends of a to-be-tested optical fiber to remove the to-be-tested optical fiber from the WDM system for measurement. As a result, a large amount of time and a large amount of labor are consumed, measurement costs are high, and measurement efficiency is low.

SUMMARY

Embodiments of the present invention provide a method for measuring a dispersion coefficient of an optical fiber, to improve measurement efficiency and reduce measurement costs.

A first aspect of the embodiments of the present invention provides a method for measuring a dispersion coefficient of an optical fiber, including: generating, by a network device, a first optical supervisory channel OSC measurement signal and a second OSC measurement signal having different wavelengths, and sending the generated measurement signals; receiving, by the network device, the returned first OSC measurement signal and second OSC measurement signal, where the first OSC measurement signal and the second OSC measurement signal are both transmitted through a first optical fiber and a second optical fiber to return to the network device, the first OSC measurement signal is transmitted through the first optical fiber and the second optical fiber in opposite transmission directions, the second OSC measurement signal is transmitted through the first optical fiber and the second optical fiber in opposite transmission directions, the first optical fiber and the second optical fiber are a to-be-tested optical fiber, and dispersion coefficients of the optical fibers are the same; determining, by the network device, a delay difference between the received first OSC measurement signal and second OSC measurement signal, where the delay difference is a difference between duration of the first OSC measurement signal and duration of the second OSC measurement signal being transmitted through the to-be-tested optical fiber; and determining, by the network device, a dispersion coefficient of the to-be-tested optical fiber based on the delay difference. The transmission directions of the first OSC measurement signal and the second OSC measurement signal through the to-be-tested optical fiber may be: For the first OSC measurement signal, the network device sends the first OSC measurement signal through the first optical fiber, and receives the first OSC measurement signal through the second optical fiber. For the second OSC measurement signal, the network device sends the second OSC measurement signal through the second optical fiber, and receives the second OSC measurement signal through the first optical fiber; or, sends the second OSC measurement signal through the first optical fiber, and receives the second OSC measurement signal through the second optical fiber.

In the embodiments of the present invention, the dispersion coefficient of the to-be-tested optical fiber is obtained without damaging the to-be-tested optical fiber, so that measurement efficiency is improved, labor use and optical fiber loss are reduced, and measurement costs are reduced.

With reference to the first aspect of the embodiments of the present invention, in a first implementation of the first aspect of the embodiments of the present invention, the determining, by the network device, a delay difference between the received first OSC measurement signal and second OSC measurement signal includes: obtaining, by the network device, a first sending timestamp and a first receiving timestamp of the received first OSC measurement signal, and obtaining a second sending timestamp and a second receiving timestamp of the received second OSC measurement signal; determining, by the network device, first transmission duration and second transmission duration, where the first transmission duration is a difference between the first receiving timestamp and the first sending timestamp, and the second transmission duration is a difference between the second receiving timestamp and the second sending timestamp; and determining, by the network device, the delay difference based on the first transmission duration and the second transmission duration, where the delay difference is a difference between the first transmission duration and the second transmission duration. In the embodiments of the present invention, the delay difference between the first OSC measurement signal and the second OSC measurement signal is determined in a timestamp manner, so that implementability of the embodiments of the present invention is improved.

With reference to the first aspect of the embodiments of the present invention, in a second implementation of the first aspect of the embodiments of the present invention, the determining, by the network device, a delay difference between the received first OSC measurement signal and second OSC measurement signal includes: obtaining, by the network device, a first sending moment and a first receiving moment of the received first OSC measurement signal, and obtaining a second sending moment and a second receiving moment of the received second OSC measurement signal; determining, by the network device, a first relative delay and a second relative delay, where the first relative delay is a difference between the first sending moment and the second sending moment, and the second relative delay is a difference between the first receiving moment and the second receiving moment; and determining, by the network device, the delay difference based on the first relative delay and the second relative delay, where the delay difference is a difference between the first relative delay and the second relative delay. In the embodiments of the present invention, the delay difference between the first OSC measurement signal and the second OSC measurement signal is determined in a relative delay manner, so that implementability of the embodiments of the present invention is improved.

With reference to the first aspect of the embodiments of the present invention, in a third implementation of the first aspect of the embodiments of the present invention, the determining, by the network device, a delay difference between the received first OSC measurement signal and second OSC measurement signal includes: obtaining, by the network device, a first sending moment and a first receiving moment of the received first OSC measurement signal, and obtaining a second sending moment and a second receiving moment of the received second OSC measurement signal, where the first sending moment is the same as the second sending moment; and determining, by the network device, the delay difference based on the first receiving moment and the second receiving moment, where the delay difference is a difference between the first receiving moment and the second receiving moment. In the embodiments of the present invention, the delay difference between the first OSC measurement signal and the second OSC measurement signal is determined in a relative delay manner, and the first OSC measurement signal and the second OSC measurement signal are sent simultaneously, so that an implementation is added, and operability of the embodiments of the present invention is improved.

With reference to the first aspect of the embodiments of the present invention, in a fourth implementation of the first aspect of the embodiments of the present invention, before the determining, by the network device, a dispersion coefficient of the to-be-tested optical fiber based on the delay difference, the method further includes: obtaining, by the network device, a total transmission length L of the to-be-tested optical fiber by using a preset optical fiber length measurement function; and the determining, by the network device, a dispersion coefficient of the to-be-tested optical fiber based on the delay difference includes: determining, by the network device, the dispersion coefficient of the to-be-tested optical fiber based on the delay difference and the total transmission length L. In the embodiments of the present invention, a step of obtaining a transmission length of the to-be-tested optical fiber is added, so that operation steps in the embodiments of the present invention are supplemented, and the embodiments of the present invention become more logical.

With reference to the fourth implementation of the first aspect of the embodiments of the present invention, in a fifth implementation of the first aspect of the embodiments of the present invention, the determining, by the network device, the dispersion coefficient of the to-be-tested optical fiber based on the delay difference and the total transmission length L includes: determining, by the network device, the dispersion coefficient of the to-be-tested optical fiber based on the following formulas: $D=\Delta t/(\Delta\lambda*L)$, and $\Delta\lambda=\lambda 1-\lambda 2$, where D is a dispersion coefficient of the to-be-tested optical fiber at a wavelength position $(\lambda 1+\lambda 2)/2$, $\Delta t$ is the delay difference between the first OSC measurement signal and the second OSC measurement signal transmitted through the to-be-tested optical fiber, $\Delta\lambda$ is a wavelength difference between the first OSC measurement signal and the second OSC measurement signal, $\lambda 1$ is a wavelength of the first OSC measurement signal and is a known amount, $\lambda 2$ is a wavelength of the second OSC measurement signal and is a known amount, and L is the total transmission length of the to-be-tested optical fiber. The embodiments of the present invention provide specific calculation formulas for the to-be-tested optical fiber, so that operability and implementability of the embodiments of the present invention are improved.

With reference to any one of the first aspect of the embodiments of the present invention to the fifth implementation of the first aspect, in a sixth implementation of the first aspect of the embodiments of the present invention, the method further includes: temporarily storing, by the network device, data of a communication service within a measurement period; and sending, by the network device, the temporarily stored data of the communication service to the to-be-tested optical fiber after measurement ends. In the embodiments of the present invention, the data of the communication service can be temporarily stored within the measurement period, and the temporarily stored data of the communication service is returned to an optical fiber system after measurement ends, so that normal communication of the communication service is ensured, and impact of a measurement process on the communication service is reduced.

With reference to any one of the first aspect of the embodiments of the present invention to the fifth implementation of the first aspect, in a seventh implementation of the first aspect of the embodiments of the present invention, the method further includes: determining, by the network device based on a one-to-one correspondence between dispersion coefficients and optical fiber types of the to-be-tested optical fiber, an optical fiber type of the to-be-tested optical fiber corresponding to the dispersion coefficient of the to-be-tested optical fiber. In the embodiments of the present invention, the one-to-one correspondence between dispersion coefficients and optical fiber types can be used to determine the optical fiber type of the to-be-tested optical fiber, so that a requirement of learning about an optical fiber type during construction is met.

A second aspect of the embodiments of the present invention provides a network device, including: a first sending unit, configured to send a first optical supervisory channel OSC measurement signal and a second OSC measurement signal, where wavelengths of the first OSC measurement signal and the second OSC measurement signal are different; a receiving unit, configured to receive the returned first OSC measurement signal and second OSC measurement signal, where the first OSC measurement signal is transmitted through a first optical fiber and a second optical fiber to return to the network device, the second OSC measurement signal is transmitted through the first optical fiber and the second optical fiber to return to the network device, the first OSC measurement signal is transmitted through the first optical fiber and the second optical fiber in opposite transmission directions, the second OSC measurement signal is transmitted through the first optical fiber and the second optical fiber in opposite transmission directions, and the first optical fiber and the second optical fiber are a to-be-tested optical fiber; a first determining unit, configured to determine a delay difference between the received first OSC measurement signal and second OSC measurement signal, where the delay difference is a difference between duration of the first OSC measurement signal and duration of the second OSC measurement signal being transmitted through the to-be-tested optical fiber; and a second determining unit, configured to determine a dispersion coefficient of the to-be-tested optical fiber based on the delay difference. In the embodiments of the present invention, the dispersion coefficient of the to-be-tested optical fiber is obtained without damaging the to-be-tested optical fiber, so that measurement efficiency is improved, labor use and optical fiber loss are reduced, and measurement costs are reduced.

With reference to the second aspect of the embodiments of the present invention, in a first implementation of the second aspect of the embodiments of the present invention, the first determining unit includes: a first obtaining module, configured to: obtain a first sending timestamp and a first receiving timestamp of the received first OSC measurement signal, and obtain a second sending timestamp and a second receiving timestamp of the received second OSC measurement signal; a first determining module, configured to determine first transmission duration and second transmission duration, where the first transmission duration is a difference between the first receiving timestamp and the first sending timestamp, and the second transmission duration is a difference between the second receiving timestamp and the second sending timestamp; and a second determining module, configured to determine the delay difference based on the first transmission duration and the second transmission duration, where the delay difference is a difference between the first transmission duration and the second transmission duration. In the embodiments of the present invention, the delay difference between the first OSC measurement signal and the second OSC measurement signal is determined in a timestamp manner, so that implementability of the embodiments of the present invention is improved.

With reference to the second aspect of the embodiments of the present invention, in a second implementation of the second aspect of the embodiments of the present invention, the first determining unit includes: a second obtaining module, configured to: obtain a first sending moment and a first receiving moment of the received first OSC measurement signal, and obtain a second sending moment and a second receiving moment of the received second OSC measurement signal; a third determining module, configured to determine a first relative delay and a second relative delay, where the first relative delay is a difference between the first sending moment and the second sending moment, and the second relative delay is a difference between the first receiving moment and the second receiving moment; and a fourth determining module, configured to determine the delay difference based on the first relative delay and the second relative delay, where the delay difference is a difference between the first relative delay and the second relative delay. In the embodiments of the present invention, the delay difference between the first OSC measurement signal and the second OSC measurement signal is determined in a relative delay manner, so that implementability of the embodiments of the present invention is improved.

With reference to the second aspect of the embodiments of the present invention, in a third implementation of the second aspect of the embodiments of the present invention, the first determining unit includes: a third obtaining module, configured to: obtain a first sending moment and a first receiving moment of the received first OSC measurement signal, and obtain a second sending moment and a second receiving moment of the received second OSC measurement signal, where the first sending moment is the same as the second sending moment; and a fifth determining module, configured to determine the delay difference based on the first receiving moment and the second receiving moment, where the delay difference is a difference between the first receiving moment and the second receiving moment. In the embodiments of the present invention, the delay difference between the first OSC measurement signal and the second OSC measurement signal is determined in a relative delay manner, and the first OSC measurement signal and the second OSC measurement signal are sent simultaneously, so that an implementation is added, and operability of the embodiments of the present invention is improved.

With reference to the second aspect of the embodiments of the present invention, in a fourth implementation of the second aspect of the embodiments of the present invention, the network device further includes: an obtaining unit, configured to obtain a total transmission length L of the to-be-tested optical fiber by using a preset optical fiber length measurement function; and the second determining unit is further configured to determine the dispersion coefficient of the to-be-tested optical fiber based on the delay difference and the total transmission length L. In the embodiments of the present invention, a step of obtaining a transmission length of the to-be-tested optical fiber is added, so that operation steps in the embodiments of the present invention are supplemented, and the embodiments of the present invention become more logical.

With reference to the fourth implementation of the second aspect of the embodiments of the present invention, in a fifth implementation of the second aspect of the embodiments of the present invention, the second determining unit includes: a sixth determining module, configured to determine the dispersion coefficient of the to-be-tested optical fiber based on the following formulas: $D=\Delta t/(\Delta\lambda*L)$, and $\Delta\lambda=\lambda_1-\lambda_2$, where D is a dispersion coefficient of the to-be-tested optical fiber at a wavelength position $(\lambda_1+\lambda_2)/2$, $\Delta t$ is the delay difference between the first OSC measurement signal and the second OSC measurement signal transmitted through the to-be-tested optical fiber, $\Delta\lambda$ is a wavelength difference between the first OSC measurement signal and the second OSC measurement signal, $\lambda_1$ is a wavelength of the first OSC measurement signal and is a known amount, $\lambda_2$ is a wavelength of the second OSC measurement signal and is a known amount, and L is the total transmission length of the to-be-tested optical fiber. The embodiments of the present invention provide specific calculation formulas for the to-be-tested optical fiber, so that operability and implementability of the embodiments of the present invention are improved.

With reference to any one of the second aspect of the embodiments of the present invention to the fifth implementation of the second aspect, in a sixth implementation of the second aspect of the embodiments of the present invention, the network device further includes: a temporary storage unit, configured to temporarily store data of a communication service within a measurement period; and a second sending unit, configured to send the temporarily stored data of the communication service to the to-be-tested optical fiber after measurement ends. In the embodiments of the present invention, the data of the communication service can be temporarily stored within the measurement period, and the temporarily stored data of the communication service is returned to an optical fiber system after measurement ends, so that normal communication of the communication service is ensured, and impact of a measurement process on the communication service is reduced.

With reference to any one of the second aspect of the embodiments of the present invention to the fifth implementation of the second aspect, in a seventh implementation of the second aspect of the embodiments of the present invention, the network device further includes: a third determining unit, configured to determine, based on a one-to-one correspondence between dispersion coefficients and optical fiber types of the to-be-tested optical fiber, an optical fiber type of the to-be-tested optical fiber corresponding to the dispersion coefficient of the to-be-tested optical fiber. In the embodiments of the present invention, the one-to-one correspondence between dispersion coefficients and optical fiber types can be used to determine the optical fiber type of the to-be-tested optical fiber, so that a requirement of learning about an optical fiber type during construction is met.

A third aspect of the embodiments of the present invention provides a network device, including: an optical module, a processor, a memory, an output interface, an input interface, and a bus, where the optical module, the processor, the memory, the output interface, and the input interface are connected by using the bus; the optical module is configured to generate and process the measurement signal; the processor is configured to: invoke a program for measuring a dispersion coefficient of an optical fiber from the memory, execute the program, and control the optical module to generate and process the measurement signal; the memory is configured to store data of a communication service within a measurement period and the program for measuring a dispersion coefficient of an optical fiber, and the memory is further configured to store the received measurement signal; the output interface is configured to send the measurement signal generated by the optical module to a connected optical fiber; the input interface is configured to receive the measurement signal returned from the connected optical fiber; and the processor invokes an instruction of the program in the memory, so that the network device performs the method for measuring a dispersion coefficient of an optical fiber in any one of the first aspect to the seventh implementation of the first aspect. The embodiments of the present invention provide the network device, so that measurement efficiency is improved, and measurement costs are reduced.

It can be learned from the foregoing technical solutions that the embodiments of the present invention have the following advantages:

In the technical solution provided in the embodiments of the present invention, the network device sends the first optical supervisory channel OSC measurement signal and the second OSC measurement signal, where wavelengths of the first OSC measurement signal and the second OSC measurement signal are different; the network device receives the returned first OSC measurement signal and second OSC measurement signal, where the first OSC measurement signal is transmitted through the first optical fiber and the second optical fiber to return to the network device, the second OSC measurement signal is transmitted through the first optical fiber and the second optical fiber to return to the network device, the first OSC measurement signal is transmitted through the first optical fiber and the second optical fiber in opposite transmission directions, the second OSC measurement signal is transmitted through the first optical fiber and the second optical fiber in opposite transmission directions, and the first optical fiber and the second optical fiber are a to-be-tested optical fiber; the network device determines a delay difference between the received first OSC measurement signal and second OSC measurement signal, where the delay difference is the difference between the duration of the first OSC measurement signal and the duration of the second OSC measurement signal being transmitted through the to-be-tested optical fiber; and the network device determines the dispersion coefficient of the to-be-tested optical fiber based on the delay difference. In the embodiments of the present invention, the dispersion coefficient of the to-be-tested optical fiber is obtained without damaging the to-be-tested optical fiber, so that measurement efficiency is improved, labor use and optical fiber loss are reduced, and measurement costs are reduced.

DESCRIPTION OF EMBODIMENTS

Embodiments of the present invention provide a method for measuring a dispersion coefficient of an optical fiber, to improve measurement efficiency and reduce measurement costs.

To enable persons in the art to better understand the solutions in this application, the embodiments of the present invention are described below with reference to the accompanying drawings in the embodiments of the present invention.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The embodiments of the present invention may be applied to various optical fiber communications networks such as a wavelength division multiplexing system, a synchronous optical network (SONET), and synchronous digital hierarchy (SDH) and other optical communications networks.

Figure 1:
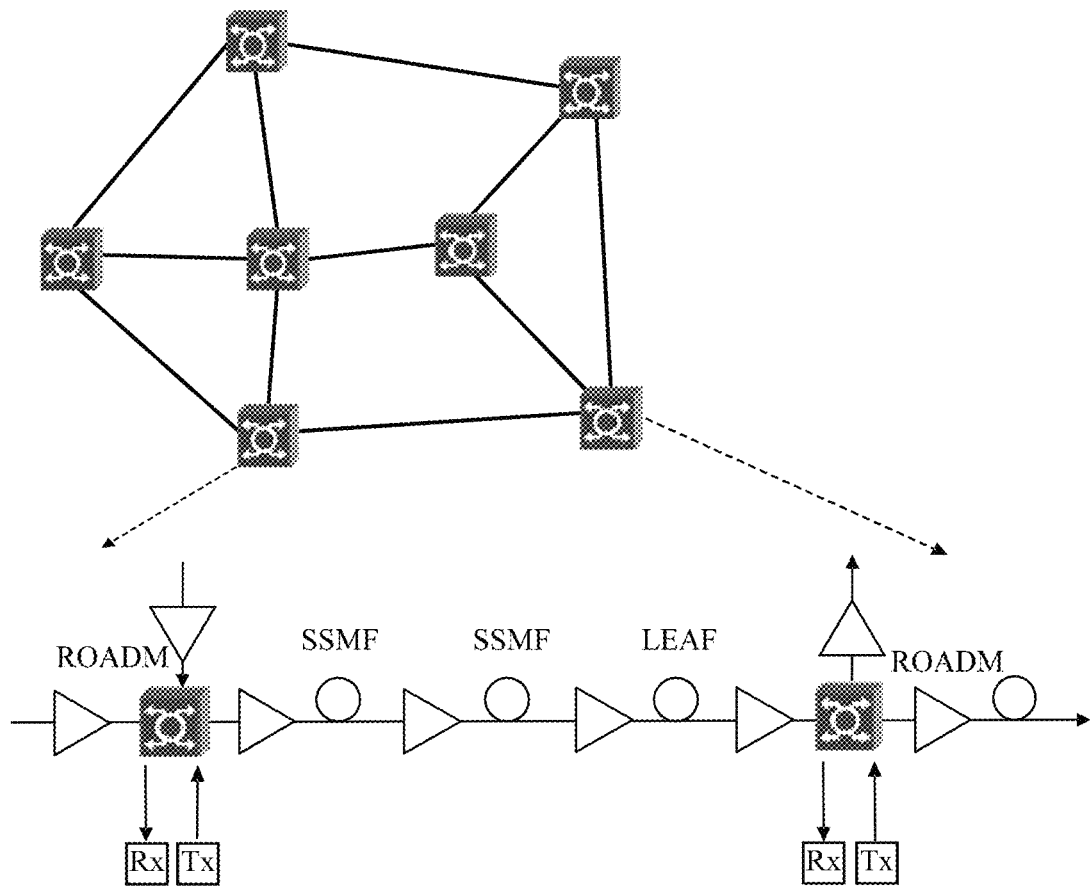
FIG. 1 is a schematic diagram of an actual application scenario according to an embodiment of the present invention.

For ease of understanding, application to a wavelength division network is used as an example for detailed description below. As shown in FIG. 1, one wavelength division network includes many spans. Different spans may have different optical fiber types. Different optical fiber types correspond to different dispersion coefficients. Dispersion is a physical phenomenon that different frequency components of a signal transmitted through an optical fiber or various mode components of signal energy disperse from each other due to different group velocities during transmission, resulting in waveform distortion and pulse broadening of a transmitted signal. Dispersion in an optical fiber causes pulse distortion of a transmitted signal, resulting in limited transmission capacity and transmission bandwidth of the optical fiber. In principle, the dispersion in the optical fiber includes material dispersion, waveguide dispersion, and mode dispersion. The first two types of dispersion occur because a signal does not have a single frequency, and the last type of dispersion occurs because a signal does not have a single mode. Dispersion in this application is chromatic dispersion, which includes material dispersion, waveguide dispersion, mode dispersion, and the like, but does not include polarization mode dispersion (PMD). In a coherent transmission system, a digital signal processing (DSP) technology already compensates for PMD, and PMD is no longer a limitation factor in system transmission.

In the prior art, when it is known that an optical fiber type is one of several fixed optical fiber types, none of the methods for determining the types of optical fibers can thoroughly distinguish between the several optical fiber types. An optical fiber sample (a section of a to-be-tested optical fiber is selected, and such an operation leads to violation of integrity of the to-be-tested optical fiber) needs to be collected on site, and dedicated meters are used to perform measurement. Therefore, the methods have complex operations, may cause service interruption, and are not operable in a large-scale WDM network. A dispersion coefficient of an optical fiber is a major focus in WDM transmission, but a dispersion coefficient cannot be directly obtained by using these measurement methods.

In view of this, the embodiments of the present invention provide a method for measuring a dispersion coefficient of an optical fiber and a network device. The method for measuring a dispersion coefficient of an optical fiber includes: sending, by a network device, a first optical supervisory channel OSC measurement signal and a second OSC measurement signal, where wavelengths of the first OSC measurement signal and the second OSC measurement signal are different; receiving, by the network device, the returned first OSC measurement signal and second OSC measurement signal, where the first OSC measurement signal and the second OSC measurement signal are both transmitted through a first optical fiber and a second optical fiber to return to the network device, the first OSC measurement signal is transmitted through the first optical fiber and the second optical fiber in opposite transmission directions, the second OSC measurement signal is transmitted through the first optical fiber and the second optical fiber in opposite transmission directions, and the first optical fiber and the second optical fiber are a to-be-tested optical fiber; determining, by the network device, a delay difference between the received first OSC measurement signal and second OSC measurement signal, where the delay difference is a difference between duration of the first OSC measurement signal and duration of the second OSC measurement signal being transmitted through the to-be-tested optical fiber; and determining, by the network device, a dispersion coefficient of the to-be-tested optical fiber based on the delay difference.

Figure 2:
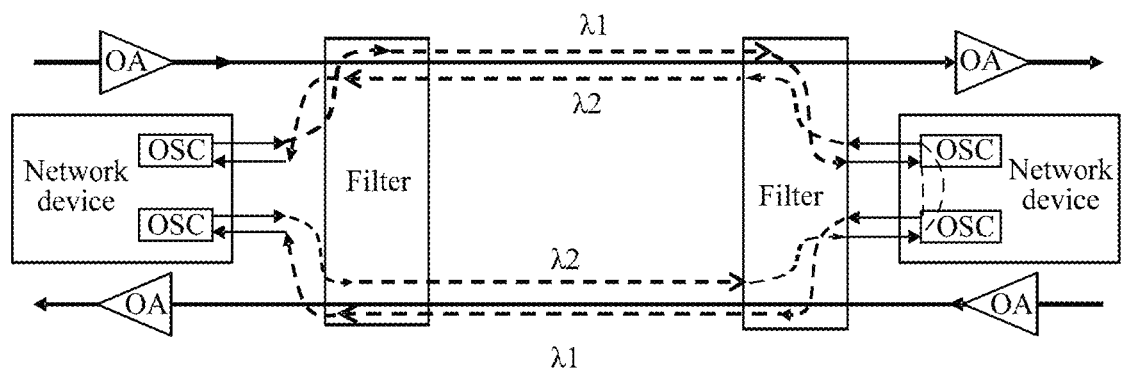
FIG. 2 is a schematic diagram of a network architecture according to an embodiment of the present invention.

The embodiments of the present invention may be applied to a network architecture shown in FIG. 2. In the network architecture, a two-fiber bidirectional transmission principle in an optical fiber system is used. The network device sends two OSC measurement signals having different wavelengths through one optical fiber. The wavelengths are known amounts $\lambda 1$ and $\lambda 2$. The network device receives the two sent OSC measurement signals having different wavelengths through another optical fiber. Both the OSC measurement signal whose wavelength is $\lambda 1$ and the OSC measurement signal whose wavelength is $\lambda 2$ need to be transmitted through the two optical fibers. The OSC measurement signal whose wavelength is $\lambda 1$ and the OSC measurement signal whose wavelength is $\lambda 2$ are transmitted through the optical fibers by a same distance. Based on a basic principle of dispersion, a delay difference generated when the OSC measurement signal whose wavelength is $\lambda 1$ and the OSC measurement signal whose wavelength is $\lambda 2$ are transmitted through the same pair of optical fibers by the same distance is measured. An existing function in the system automatically obtains optical fiber length information. A dispersion coefficient at a wavelength $(\lambda 1+\lambda 2)/2$ of the optical fiber may be calculated according to the delay difference and the optical fiber length information. An optical fiber type may be determined based on a one-to-one correspondence between dispersion coefficients and optical fiber types.

Figure 3:
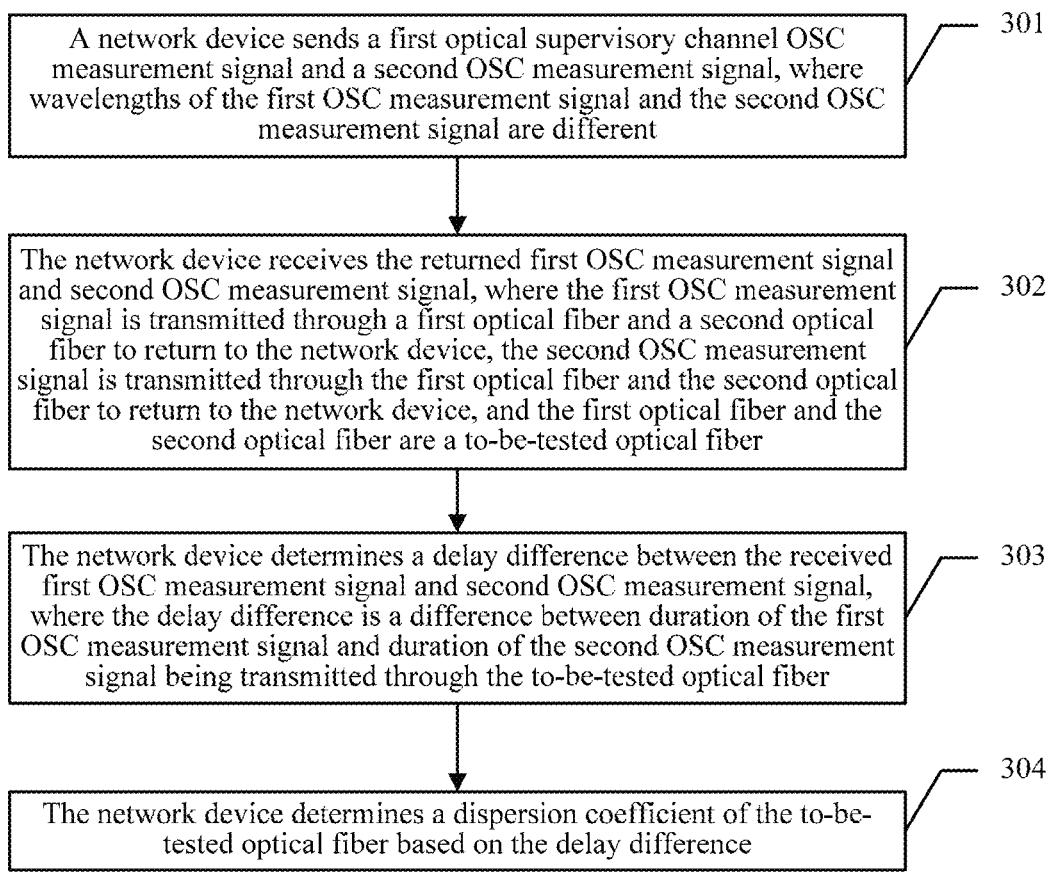
FIG. 3 is a schematic diagram of an embodiment of a method for measuring a dispersion coefficient of an optical fiber according to an embodiment of the present invention.

For ease of understanding, a specific procedure of the embodiments of the present invention is described below. Referring to FIG. 3, an embodiment of a method for measuring a dispersion coefficient of an optical fiber in the embodiments of the present invention includes:

301: A network device sends a first optical supervisory channel OSC measurement signal and a second OSC measurement signal, where wavelengths of the first OSC measurement signal and the second OSC measurement signal are different.

When a dispersion coefficient of a to-be-tested optical fiber needs to be measured to determine an optical fiber type of the optical fiber, the network device starts to execute a program for measuring a dispersion coefficient of an optical fiber. Before the measurement program is executed, a section of the optical fiber needs to be chosen as a target optical fiber, that is, the to-be-tested optical fiber. The to-be-tested optical fiber includes at least a first optical fiber and a second optical fiber. The network device controls an optical module to generate the first OSC measurement signal and the second OSC measurement signal having different wavelengths and sends the first OSC measurement signal and the second OSC measurement signal to the to-be-tested optical fiber.

It should be noted that the wavelengths of the first OSC measurement signal and the second OSC measurement signal are different. The measurement signals having different wavelengths correspond to different frequencies, and require different duration to be transmitted through an optical fiber by a same distance. Based on formulas for calculating a dispersion coefficient of an optical fiber: $D=\Delta t/(\Delta\lambda^* L)$, and $\lambda\alpha=\lambda 1-\lambda 2$, it can be learned that D is a dispersion coefficient of the to-be-tested optical fiber at a wavelength position $(\lambda 1+\lambda 2)/2$, $\Delta\lambda$ is a wavelength difference between the first OSC measurement signal and the second OSC measurement signal, and L is a total transmission length of the to-be-tested optical fiber. To facilitate calculation of the dispersion coefficient of the optical fiber, the difference between the wavelength $\lambda 1$ of the first OSC measurement signal and the wavelength $\lambda 2$ of the second OSC measurement signal are preset. Different total transmission lengths correspond to different delay differences, and different dispersion coefficients are obtained. In this case, values of the total transmission length L of the to-be-tested optical fiber are 20 km, 40 km, 60 km, 80 km, and 100 km, and may further be other values. This is not specifically limited herein. It may be understood that the wavelength difference may further be set based on an actual case, for example, $\Delta\lambda=\lambda 1-\lambda 2=10$ nm, or $\Delta\lambda=\lambda 1-\lambda 2=100$ nm, or may further have another value. This is not specifically limited herein.

302: The network device receives the returned first OSC measurement signal and second OSC measurement signal, where the first OSC measurement signal is transmitted through the first optical fiber and the second optical fiber to return to the network device, the second OSC measurement signal is transmitted through the first optical fiber and the second optical fiber to return to the network device, and the first optical fiber and the second optical fiber are a to-be-tested optical fiber.

The network device receives, from the to-be-tested optical fiber, the first OSC measurement signal and the second OSC measurement signal that have been transmitted through the first optical fiber and the second optical fiber. The first OSC measurement signal and the second OSC measurement signal are both transmitted through the first optical fiber and the second optical fiber. For the first OSC measurement signal, the network device sends the first OSC measurement signal through the first optical fiber, and receives the first OSC measurement signal through the second optical fiber. For the second OSC measurement signal, the network device sends the second OSC measurement signal through the second optical fiber, and receives the second OSC measurement signal through the first optical fiber; or, sends the second OSC measurement signal through the first optical fiber, and receives the second OSC measurement signal through the second optical fiber. The first OSC measurement signal is transmitted through the first optical fiber and the second optical fiber in opposite transmission directions. The second OSC measurement signal is transmitted through the first optical fiber and the second optical fiber in opposite transmission directions. The first optical fiber and the second optical fiber are a same type of to-be-tested optical fiber. Dispersion coefficients of the optical fibers are the same. The two measurement signals are transmitted by a same distance, of which a specific value is discussed above. Details are not described again herein.

It should be noted that an optical fiber system still transmits data of a communication service within a measurement period. To reduce impact of a measurement process on the communication service of the entire optical fiber transmission system, the network device needs to store the data of the communication service. After the network device sends the measurement signals, data of the communication service that needs to be transmitted through the to-be-tested optical fiber within the measurement period is temporarily stored in a local memory. After receiving the first OSC measurement signal and the second OSC measurement signal returned from the to-be-tested optical fiber, the network device sends the data of the communication service temporarily stored in the local memory to the to-be-tested optical fiber, so that the communication service can be normally provided.

303: The network device determines a delay difference between the received first OSC measurement signal and second OSC measurement signal, where the delay difference is a difference between duration of the first OSC measurement signal and duration of the second OSC measurement signal being transmitted through the to-be-tested optical fiber.

The network device determines the difference, that is, the delay difference, between the duration of the received first OSC measurement signal and the duration of the second OSC measurement signal being transmitted through the to-be-tested optical fiber.

It should be noted that the network device determines the delay difference in three manners. Specific determining steps are different based on different cases.

For example, when the network device measures the delay difference in a timestamp manner, the network device sends the first OSC measurement signal and the second OSC measurement signal. The first OSC measurement signal carries a first sending timestamp, and the second OSC measurement signal carries a second sending timestamp. The measurement signals are transmitted through the first optical fiber and the second optical fiber to return the network device. The network device obtains a first receiving timestamp of the first OSC measurement signal and obtains a second receiving timestamp of the second OSC measurement signal. The network device determines, based on the first sending timestamp and the first receiving timestamp, total duration T1 of the first OSC measurement signal being transmitted through the first optical fiber and the second optical fiber, and determines, based on the second sending timestamp and the second receiving timestamp, total duration T2 of the second OSC measurement signal being transmitted through the first optical fiber and the second optical fiber. The network device determines the delay difference $\Delta t$ based on the total duration T1 and the total duration T2.

When the network device measures the delay difference in a relative delay manner, the network device sends the first OSC measurement signal and the second OSC measurement signal sent. The first OSC measurement signal carries a first sending moment, and the second OSC measurement signal carries a second sending moment. The two measurement signals are transmitted through the first optical fiber and the second optical fiber to return the network device. The network device obtains a first receiving moment of the first OSC measurement signal and a second receiving moment of the second OSC measurement signal. The network device determines, based on the first sending moment and the second sending moment, a first relative delay $\Delta t1$ of the two measurement signals being transmitted through the first optical fiber and the second optical fiber, and determines, based on the first receiving moment and the second receiving moment, a second relative delay $\Delta t2$ of the two measurement signals being transmitted through the first optical fiber and the second optical fiber. The network device determines the delay difference $\Delta t$ based on the first relative delay $\Delta t1$ and the second relative delay $\Delta t2$.

When the network device measures the delay difference in a relative delay manner and the network device sends the first OSC measurement signal and the second OSC measurement signal simultaneously, the network device sends the first OSC measurement signal and the second OSC measurement signal to the to-be-tested optical fiber. The first OSC measurement signal carries a first sending moment, and the second OSC measurement signal carries a second sending moment. The first sending moment and the second sending moment are a same moment. The two measurement signals are transmitted through the first optical fiber and the second optical fiber to return the network device. The network device obtains a first receiving moment of the first OSC measurement signal and a second receiving moment of the second OSC measurement signal. The network device determines, based on the first receiving moment and the second receiving moment, a third relative delay $\Delta t3$ of the two measurement signals being transmitted through the first optical fiber and the second optical fiber. The third relative delay $\Delta t3$ is the delay difference $\Delta t$.

304: The network device determines a dispersion coefficient of the to-be-tested optical fiber based on the delay difference.

The network device determines the dispersion coefficient of the to-be-tested optical fiber based on preset formulas and the delay difference. Based on the formulas for calculating a dispersion coefficient of an optical fiber: $D=\Delta t/(\Delta\lambda*L)$, and $\Delta\lambda=\lambda1-\lambda2$, different wavelength differences and transmission distances both affect the dispersion coefficient.

For ease of understanding, dispersion coefficients in cases of different transmission distances when the wavelength difference is 10 nm and the wavelength difference is 100 nm are described below.

Figure 4:
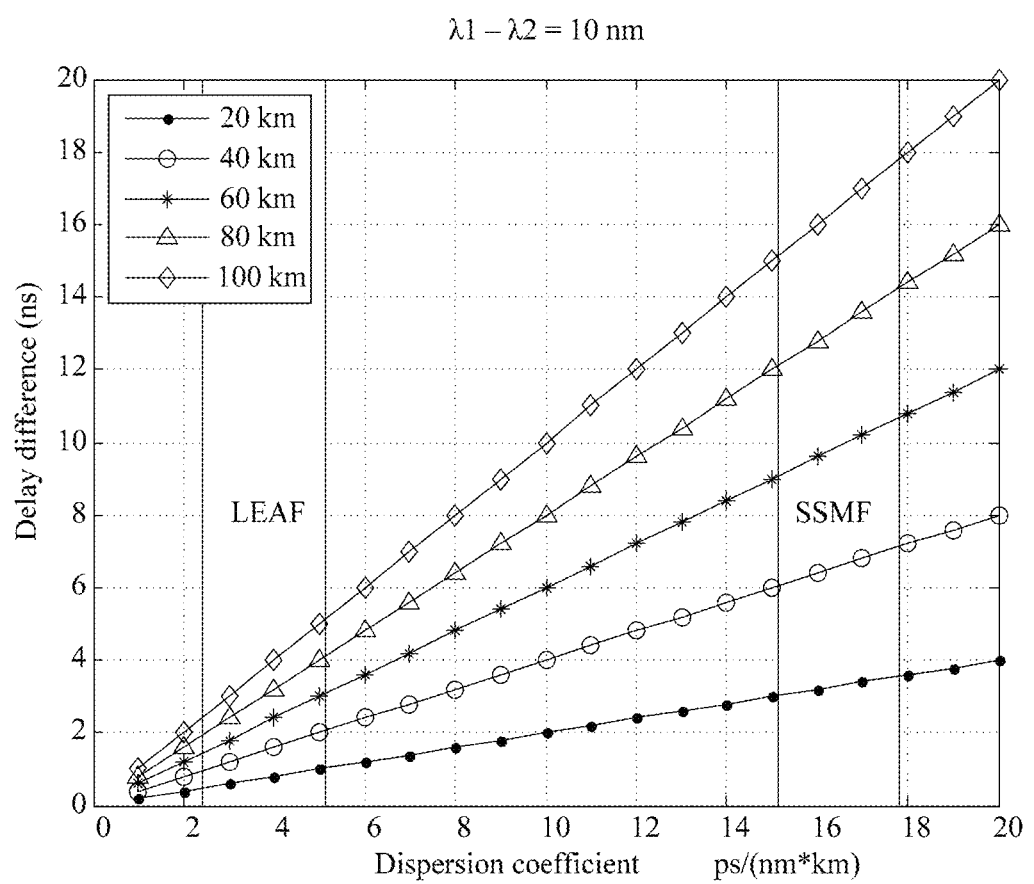
FIG. 4 is a schematic diagram of a correspondence between dispersion coefficients and delay differences according to an embodiment of the present invention.

As shown in FIG. 4, the wavelength difference $\Delta\lambda=\lambda1-\lambda2=10$ nm is used as example for description. If a total length L of a transmission distance is 20 km, the measured delay difference $\Delta t$ is 3 ns. In this case, it is calculated based on the formulas that $D=(3*10^3)/(10*20)=15$ ps/(nm*km), and the dispersion coefficient of the to-be-tested optical fiber at the wavelength position $(\lambda1+\lambda2)/2$ is 15 ps/(nm*km). If the total length L of the transmission distance is 60 km, the measured delay difference $\Delta t$ is 10 ns. In this case, it is calculated based on the formulas that $D=(10*10^3)/(10*60)=16.67$ ps/(nm*km), and the dispersion coefficient of the to-be-tested optical fiber at the wavelength position $(\lambda1+\lambda2)/2$ is approximately 16.67 ps/(nm*km). If the total length L of the transmission distance is 100 km, the measured delay difference $\Delta t$ is 4 ns. In this case, it is calculated based on the formulas that $D=(4*10^3)/(10*100)=4$ ps/(nm*km), and the dispersion coefficient of the to-be-tested optical fiber at the wavelength position $(\lambda1+\lambda2)/2$ is 4 ps/(nm*km).

It should be noted that based on a one-to-one correspondence between dispersion coefficients and optical fiber types of an optical fiber, the optical fiber type of the to-be-tested optical fiber can be determined. As shown in FIG. 4, when the total length L of the transmission distance is 20 km, the calculated dispersion coefficient D of the to-be-tested optical fiber is 15 ps/(nm*km), and the optical fiber type of the to-be-tested optical fiber is a standard single mode fiber (SSMF, Standard Single Mode Fiber). When the total length L of the transmission distance is 60 km, the calculated dispersion coefficient D of the to-be-tested optical fiber is 16.67 ps/(nm*km), and the optical fiber type of the to-be-tested optical fiber is a standard single mode fiber SSMF. When the total length L of the transmission distance is 100 km, the calculated dispersion coefficient D of the to-be-tested optical fiber is 4 ps/(nm*km), and the optical fiber type of the to-be-tested optical fiber is a large effective area fiber (Leaf, Large Effective Area Fiber).

Figure 5:
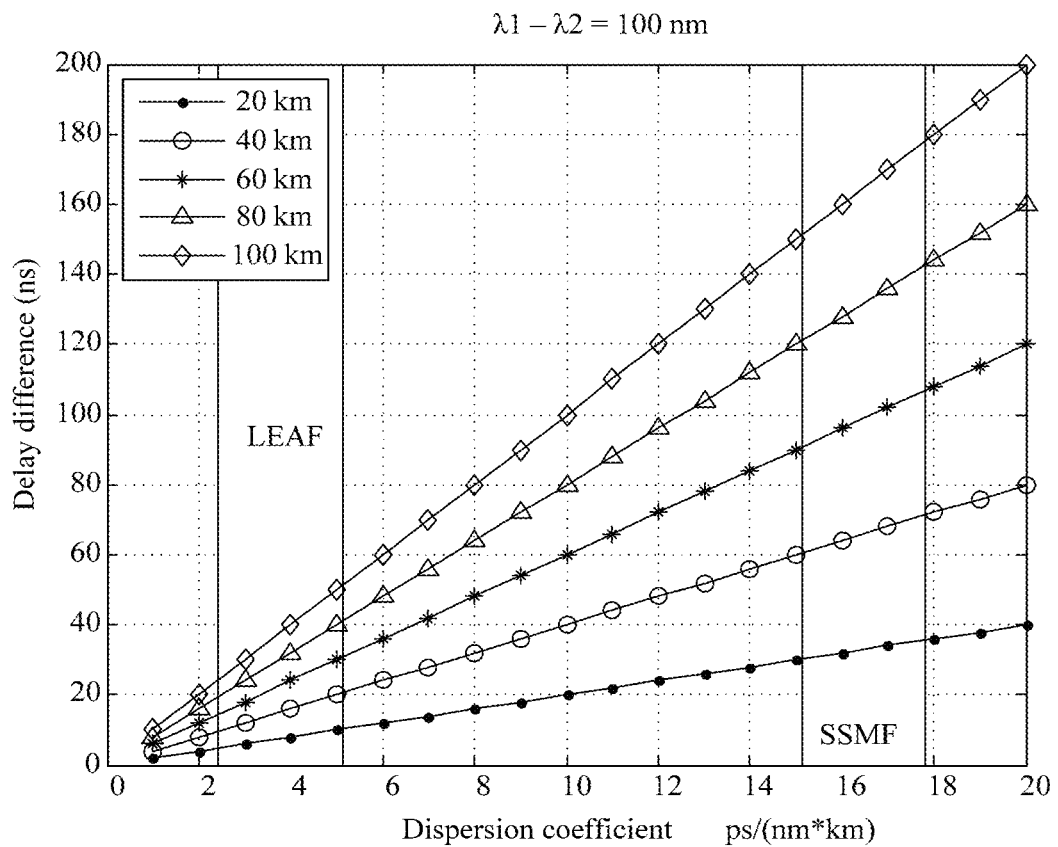
FIG. 5 is another schematic diagram of a correspondence between dispersion coefficients and delay differences according to an embodiment of the present invention.

As shown in FIG. 5, an example in which the wavelength difference $\Delta\lambda=\lambda1-\lambda2=100$ nm is used for description. If the total length L of the transmission distance is 20 km, the measured delay difference $\Delta t$ is 30 ns. In this case, it is calculated based on the formulas that $D=(30*10^3)/(100*20)=15$ ps/(nm*km), and the dispersion coefficient of the to-be-tested optical fiber at the wavelength position $(\lambda1+\lambda2)/2$ is 15 ps/(nm*km). If the total length L of the transmission distance is 60 km, the delay difference $\Delta t$ measured by the network device is 100 ns. In this case, it is calculated based on the formulas that $D=(100*10^3)/(100*60)=16.67$ ps/(nm*km). Therefore, it can be determined that the dispersion coefficient of the to-be-tested optical fiber at the wavelength position $(\lambda1+\lambda2)/2$ is 16.67 ps/(nm*km). If the total length L of the transmission distance is 100 km, the measured delay difference $\Delta t$ is 40 ns. In this case, it is calculated based on the formulas that $D=(40*10^3)/(100*100)=4$ ps/(nm*km), and the dispersion coefficient of the to-be-tested optical fiber at the wavelength position $(\lambda1+\lambda2)/2$ is 4 ps/(nm*km).

It should be noted that based on a one-to-one correspondence between dispersion coefficients and optical fiber types of an optical fiber, the optical fiber type of the to-be-tested optical fiber can be determined. As shown in FIG. 5, when the total length L of the transmission distance is 20 km, the calculated dispersion coefficient D of the to-be-tested optical fiber is 15 ps/(nm*km), and the optical fiber type of the to-be-tested optical fiber is a standard single mode fiber SSMF. When the total length L of the transmission distance is 60 km, the calculated dispersion coefficient D of the to-be-tested optical fiber is 16.67 ps/(nm*km), and the optical fiber type of the to-be-tested optical fiber is a standard single mode fiber SSMF. When the total length L of the transmission distance is 100 km, the calculated dispersion coefficient D of the to-be-tested optical fiber is 4 ps/(nm*km), and the optical fiber type of the to-be-tested optical fiber is a large effective area fiber Leaf.

In this embodiment of the present invention, the delay difference between the measurement signals having different wavelengths and transmitted through the to-be-tested optical fiber is detected without damaging the to-be-tested optical fiber, to determine the dispersion coefficient of the to-be-tested optical fiber. The optical fiber type is obtained by using the dispersion coefficient of the optical fiber, so that measurement efficiency is improved, labor use and optical fiber loss are reduced, and measurement costs are reduced.

It should be noted that there are mainly an absolute error and a relative error that affect a result of a dispersion coefficient of an optical fiber. For an absolute error of a dispersion coefficient, when measurement signals having different baud rates are used, measured dispersion coefficients of optical fibers have different precisions. When a baud rate is larger, an absolute error of measurement is smaller. For different baud rates, minimum precisions of a delay difference are different. For example, assuming that a baud rate of a signal used in measurement is B, a measurement error is at most $\Delta t_{min}=\pm 0.5/B$, that is, half a time of a symbol. When baud rates of measurement signals are 155 Mbps, 1.25 Gbps, 2.5 Gbps, and 10 Gbps, minimum precisions $\Delta t_{min}$ of the delay difference are respectively 3.23 ns, 0.4 ns, 0.2 ns, and 0.05 ns. As can be learned, when the baud rate of the measurement signal is larger, a measurement precision is higher, and an absolute error of measurement is smaller.

For a relative error of a dispersion coefficient, based on the formulas $D=\Delta t/((\lambda 1-\lambda 2)*L)$ and $\Delta\lambda=\lambda 1-\lambda 2$, when values of $\Delta\lambda$ and L are larger, a result calculated by introducing the values in the formulas is more precise. It can be learned that when the two wavelengths have a larger difference (that is, when $\Delta\lambda$ is larger and D is a fixed value, $\Delta t$ is larger, and a relative error of measurement of $\Delta t$ is smaller), an optical fiber distance is larger (that is, when L is larger and D is a fixed value, $\Delta t$ is larger, and a relative error of measurement of $\Delta t$ is smaller), and a relative error of measurement is smaller.

Therefore, when the two wavelengths have a larger difference, the optical fiber distance is larger, and the baud rate B of the measurement signal is higher (that is, the absolute error of measurement of $\Delta t$ is smaller), the dispersion coefficient D is measured more precisely, and an optical fiber type is determined more reliably. FIG. 4 and FIG. 5 show $\Delta t$ measured by using different $\Delta\lambda$ for optical fibers having different lengths and different dispersion coefficients. As can be learned, two wavelengths whose $\Delta\lambda$ is sufficiently large are chosen, a sufficiently long optical fiber is used, and a measurement signal whose baud rate B is sufficiently high is used, so that it can be ensured that an obtained dispersion coefficient of the optical fiber at $(\lambda 1+\lambda 2)/2$ has sufficient precision, to determine dispersion coefficients at different wavelengths and a type of the optical fiber.

It may be understood that, on one hand, when the optical fiber is relatively short, the delay difference between the measurement signals is small. To improve measurement precision, the baud rates of the measurement signals need to be sufficiently high. On the other hand, after the baud rates of the signals are increased, due to power/sensitivity, disperse limitation, and the like, the transmission distances of the measurement signals decrease. If the baud rates of the measurement signals are excessively high, it may be impossible to measure a long optical fiber. Therefore, it is recommended that an optical supervisory channel should support dual rates or multiple rates to adapt to measurement of dispersion in spans having different lengths. A signal having a high baud rate is used for a short-distance optical fiber. A signal having a low baud rate is used for a long-distance optical fiber. Considering that in a WDM system, a CWDM channel, for example, a channel whose wavelength is 1491 nm or 1511 nm, is usually chosen as an OSC channel, $\Delta\lambda$ may be at least 20 nm. In addition, a wavelength division system is usually a two-fiber bidirectional system, and optical fibers in both directions have the same length and type. In the method for measuring a dispersion coefficient of an optical fiber in this embodiment of the present invention, the optical fibers in both the directions are used as a whole for measurement. Assuming that $\Delta\lambda=20$ nm, when the total length (the total length of the optical fibers in both the directions) of the to-be-tested optical fiber is less than 10 km, it is recommended that the baud rates of the measurement signals should not be less than 10 Gbits/s. When the length of the to-be-tested optical fiber is between 10 km and 60 km, it is recommended that the baud rates of the measurement signals should not be less than 2.5 Gbits/s. When the length of the to-be-tested optical fiber is between 60 km and 160 km, it is recommended that the baud rates of the measurement signals should not be less than 1 Gbits/s. When the length of the to-be-tested optical fiber exceeds 160 km, it is recommended that the baud rates of the measurement signals should not be greater than 155 Mbits/s. Considering a very short optical fiber distance (for example, 1 km to 2 km or shorter), a nonlinear effect is insignificant. In this case, it is not strictly necessary to precisely measure a dispersion coefficient of an optical fiber or distinguish between optical fiber types. When the total length of the to-be-tested optical fiber is less than 60 km, the baud rate of the measurement signal uses 2.5 Gbits/s.

Figure 6:
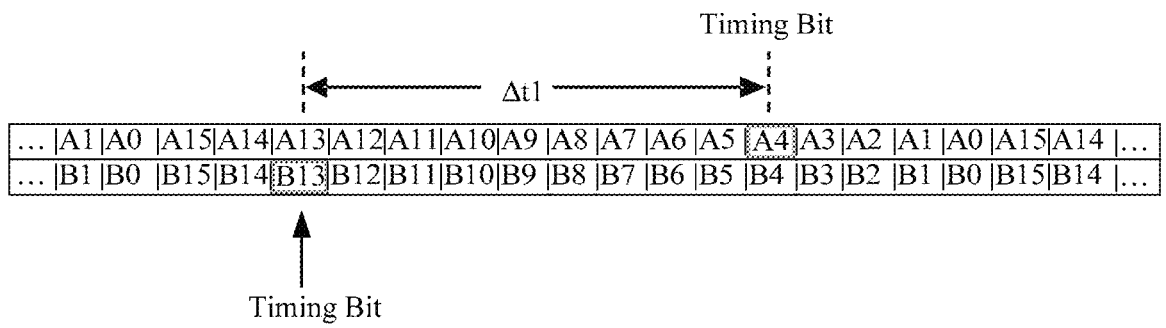
FIG. 6 is a schematic diagram of a relative delay of a test frame according to an embodiment of the present invention.

It should be noted that each of the first OSC measurement signal and the second OSC measurement signal in the foregoing embodiment is structurally a test frame that includes a segment of special bytes. The test frame may be a test frame having an n-byte combination, and for example, may be a test frame that includes 16 four-bit byte units such as 0000, 0001, 0010, . . . , 1110, and 1111, or may further be a test frame that includes other byte units. The length of the test frame may be set based on an actual requirement, and is not specifically limited herein. For example, the measurement of the first relative delay $\Delta t1$ of the first OSC measurement signal and the second OSC measurement signal is measurement of a phase difference of specific bytes in the test frames. As shown in FIG. 6, when an initial sent byte in the test frame of the first OSC measurement signal is A4, that is, a timing bit in the first OSC measurement signal is A4, and an initial sent byte in the test frame of the second OSC measurement signal is B13, that is, a timing bit in the second OSC measurement signal is B13, a sending moment of the test frame of the first OSC measurement signal is earlier than that of the test frame of the second OSC measurement signal. In this case, the first relative delay $\Delta t1$ is a time difference between the two timing bits.

Figure 7:
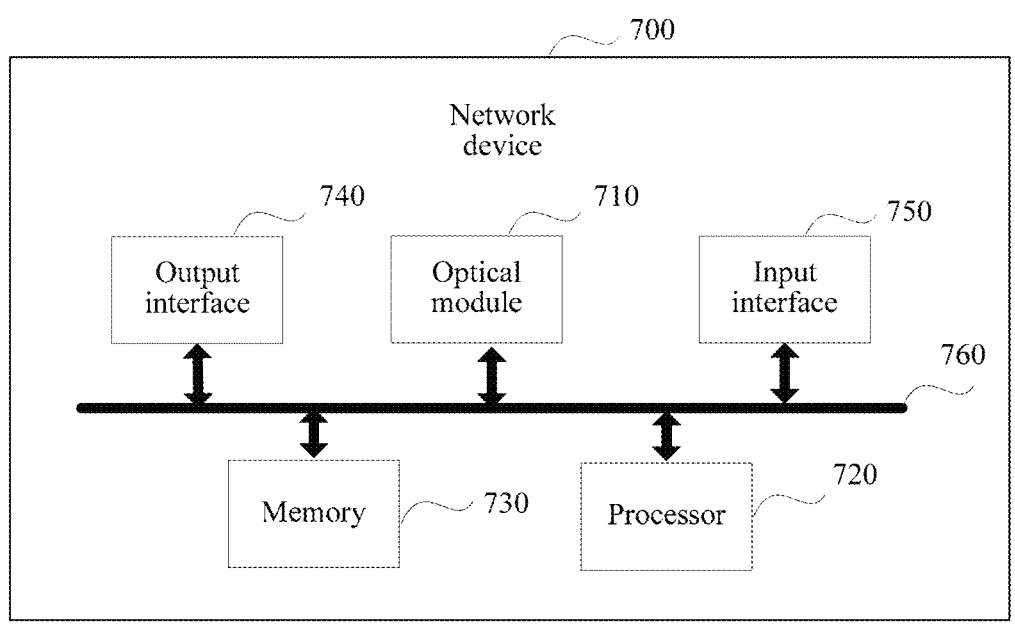
FIG. 7 is a schematic diagram of an embodiment of a network device according to an embodiment of the present invention.

The method for measuring a dispersion coefficient of an optical fiber in the embodiments of the present invention is described above. A network device in the embodiments of the present invention is described below. Referring to FIG. 7, an embodiment of a network device in the embodiments of the present invention includes: an optical module 710, a processor 720, a memory 730, an output interface 740, an input interface 750, and a bus 760.

The optical module 710, the processor 720, the memory 730, the output interface 740, and the input interface 750 are connected by using the bus 760. The optical module 710 is configured to generate and process a measurement signal. The processor 720 is configured to: invoke a program for measuring a dispersion coefficient of an optical fiber from the memory 730, execute the program, and control the optical module 710 to generate and process the measurement signal. The memory 730 is configured to store data of a communication service within a measurement period and the program for measuring a dispersion coefficient of an optical fiber, and the memory 730 is further configured to store the received measurement signal. The output interface 740 is configured to send the measurement signal generated by the optical module 710 to a connected optical fiber. The input interface 750 is configured to receive the measurement signal returned from the connected optical fiber. The bus 760 may be a standard peripheral component interconnect (PCI for short) bus, an Extended Industry Standard Architecture (EISA for short) bus, or the like. The bus 760 may be classified into an address bus, a data bus, a control bus, and the like. For ease of representation, only one thick line is used to represent the bus in FIG. 7, but this does not mean that there is only one bus or only one type of bus. The processor 720 invokes an instruction of the program in the memory 730, so that the network device performs any method for measuring a dispersion coefficient of an optical fiber that is performed by the network device and that is provided in this embodiment of the present invention, and reports a measurement result by using a network management system (NMS).

The processor 720 is a control center of the network device and may control the optical module 710, the memory 730, the output interface 740, and the input interface 750 to measure the dispersion coefficient of the optical fiber based on the method described in the foregoing embodiment. The processor 720 may be a central processing unit (CPU), a general purpose processor, a digital signal processor (DSP), an application-specific integrated circuit (ASIC), a field programmable gate array (FPGA), another programmable logic device, a transistor logic device, a hardware component or any combination thereof. The controller/processor may implement or execute various example logical blocks, modules, and circuits described with reference to content disclosed in the embodiments of the present invention. Alternatively, the processor may be a combination of processors implementing a computing function, for example, a combination of one or more microprocessors, or a combination of the DSP and a microprocessor.

The memory 730 may be configured to store a software program and a module, and the processor 720 runs the software program and the module that are stored in the memory 730, so as to perform various functional applications of the mobile terminal and data processing. The memory 730 may mainly include a program storage area and a data storage area. The program storage area may store an operating system, an application program required for at least one function (for example, a function of receiving a measurement signal), and the like. The data storage area may store data created based on use of the network device (for example, delay difference data, and a sending moment), and the like. In addition, the memory 730 may include a high-speed random-access memory, and may further include a non-volatile memory, such as at least one magnetic disk storage device, a flash storage device, or another volatile solid-state storage device. In this embodiment of the present invention, the program for measuring a dispersion coefficient of an optical fiber is stored in the memory 730, and is invoked by the processor 720 from the memory 730 when the program needs to be used.

In this embodiment of the present invention, the output interface 740 and the input interface 750 are respectively used to send and receive the measurement signal generated by the optical module 710. The processor 720 is connected to the output interface 740 and the input interface 750 by using an internal bus of the network device. The output interface 740 and the input interface 750 are respectively connected to two ends of a to-be-tested optical fiber, to eventually implement that the measurement signal sent by the network device is transmitted through the to-be-tested optical fiber to return to the network device. Remote measurement and reporting can be implemented by combining the network device and the network management system. Labor use and optical fiber loss are reduced, and measurement costs are reduced.

Figure 8:
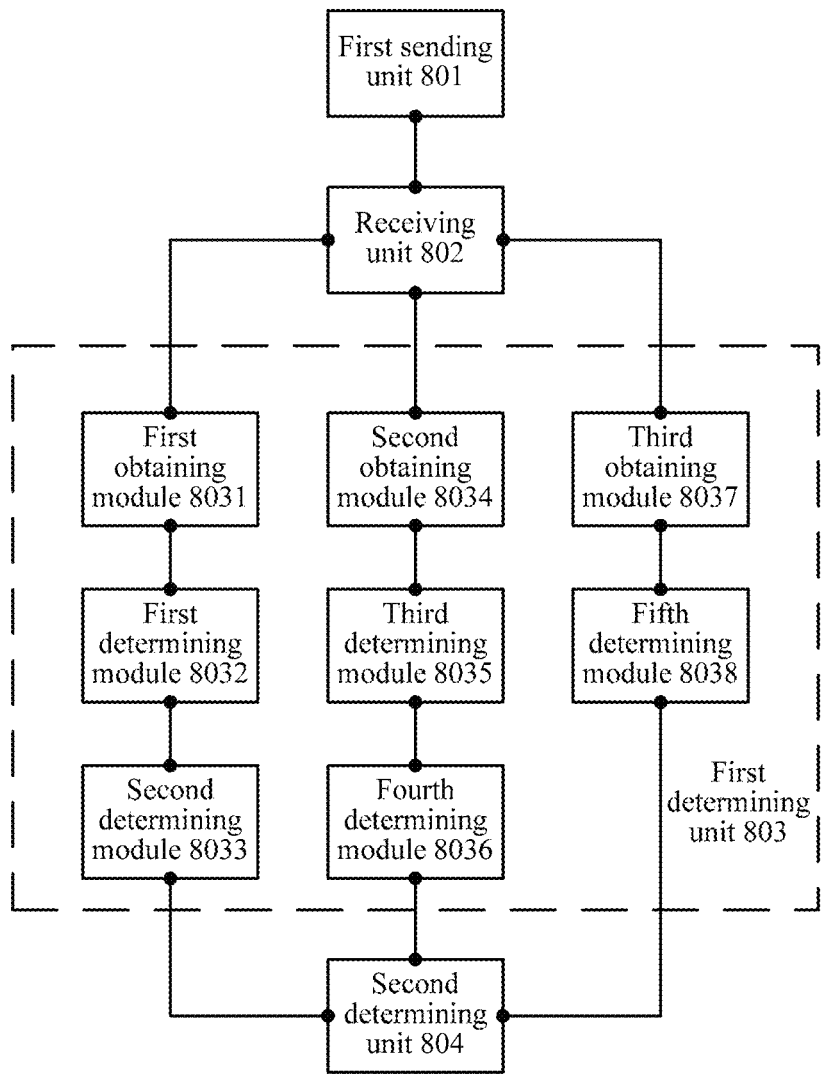
FIG. 8 is a schematic diagram of another embodiment of a network device according to an embodiment of the present invention.

The network device in the embodiments of the present invention is described in detail in FIG. 7 from the perspective of hardware processing. A network device in the embodiments of the present invention is described below in detail from the perspective of modular functional entities. Referring to FIG. 8, an embodiment of a network device in the embodiments of the present invention includes:

a first sending unit 801, configured to send a first optical supervisory channel OSC measurement signal and a second OSC measurement signal, where wavelengths of the first OSC measurement signal and the second OSC measurement signal are different;

a receiving unit 802, configured to receive the returned first OSC measurement signal and second OSC measurement signal, where the first OSC measurement signal is transmitted through a first optical fiber and a second optical fiber to return to the network device, the second OSC measurement signal is transmitted through the first optical fiber and the second optical fiber to return to the network device, the first OSC measurement signal is transmitted through the first optical fiber and the second optical fiber in opposite transmission directions, the second OSC measurement signal is transmitted through the first optical fiber and the second optical fiber in opposite transmission directions, and the first optical fiber and the second optical fiber are a to-be-tested optical fiber;

a first determining unit 803, configured to determine a delay difference between the received first OSC measurement signal and second OSC measurement signal, where the delay difference is a difference between duration of the first OSC measurement signal and duration of the second OSC measurement signal being transmitted through the to-be-tested optical fiber; and a second determining unit 804, configured to determine a dispersion coefficient of the to-be-tested optical fiber based on the delay difference.

Optionally, the first determining unit 803 may include:

a first obtaining module 8031, configured to: obtain a first sending timestamp and a first receiving timestamp of the received first OSC measurement signal, and obtain a second sending timestamp and a second receiving timestamp of the received second OSC measurement signal;

a first determining module 8032, configured to determine first transmission duration and second transmission duration, where the first transmission duration is a difference between the first receiving timestamp and the first sending timestamp, and the second transmission duration is a difference between the second receiving timestamp and the second sending timestamp; and a second determining module 8033, configured to determine the delay difference based on the first transmission duration and the second transmission duration, where the delay difference is a difference between the first transmission duration and the second transmission duration.

Optionally, the first determining unit 803 may further include:

a second obtaining module 8034, configured to: obtain a first sending moment and a first receiving moment of the received first OSC measurement signal, and obtain a second sending moment and a second receiving moment of the received second OSC measurement signal;

a third determining module 8035, configured to determine a first relative delay and a second relative delay, where the first relative delay is a difference between the first sending moment and the second sending moment, and the second relative delay is a difference between the first receiving moment and the second receiving moment; and a fourth determining module 8036, configured to determine the delay difference based on the first relative delay and the second relative delay, where the delay difference is a difference between the first relative delay and the second relative delay.

Optionally, the first determining unit 803 may further include:

a third obtaining module 8037, configured to: obtain a first sending moment and a first receiving moment of the received first OSC measurement signal, and obtain a second sending moment and a second receiving moment of the received second OSC measurement signal, where the first sending moment is the same as the second sending moment; and a fifth determining module 8038, configured to determine the delay difference based on the first receiving moment and the second receiving moment, where the delay difference is a difference between the first receiving moment and the second receiving moment.

In this embodiment of the present invention, the dispersion coefficient of the to-be-tested optical fiber is obtained without damaging the to-be-tested optical fiber. Remote measurement and reporting can be implemented by combining the network device and a network management system, so that measurement efficiency is improved, labor use and optical fiber loss are reduced, and measurement costs are reduced.

Figure 9:
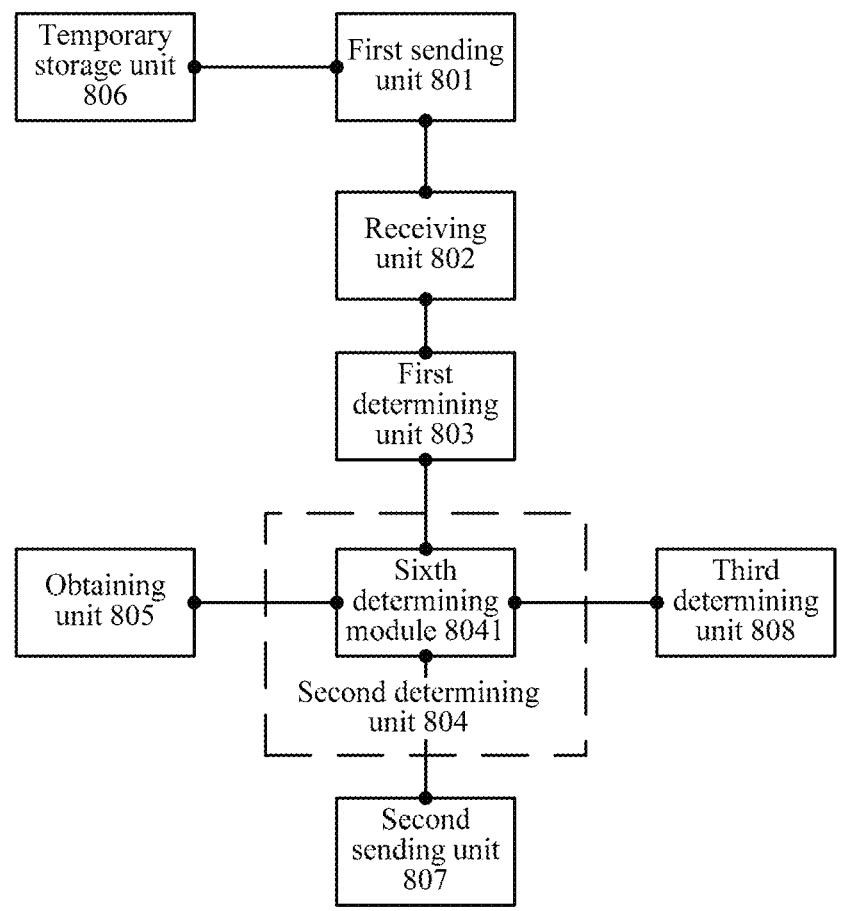
FIG. 9 is a schematic diagram of another embodiment of a network device according to an embodiment of the present invention.

Referring to FIG. 9, another embodiment of a network device in the embodiments of the present invention includes:

a first sending unit 801, configured to send a first optical supervisory channel OSC measurement signal and a second OSC measurement signal, where wavelengths of the first OSC measurement signal and the second OSC measurement signal are different;

a receiving unit 802, configured to receive the returned first OSC measurement signal and second OSC measurement signal, where the first OSC measurement signal is transmitted through a first optical fiber and a second optical fiber to return to the network device, the second OSC measurement signal is transmitted through the first optical fiber and the second optical fiber to return to the network device, the first OSC measurement signal is transmitted through the first optical fiber and the second optical fiber in opposite transmission directions, the second OSC measurement signal is transmitted through the first optical fiber and the second optical fiber in opposite transmission directions, and the first optical fiber and the second optical fiber are a to-be-tested optical fiber;

a first determining unit 803, configured to determine a delay difference between the received first OSC measurement signal and second OSC measurement signal, where the delay difference is a difference between duration of the first OSC measurement signal and duration of the second OSC measurement signal being transmitted through the to-be-tested optical fiber; and a second determining unit 804, configured to determine a dispersion coefficient of the to-be-tested optical fiber based on the delay difference.

Optionally, the network device may further include:

an obtaining unit 805, configured to obtain a total transmission length L of the to-be-tested optical fiber by using a preset optical fiber length measurement function; and the second determining unit 804 is further configured to determine the dispersion coefficient of the to-be-tested optical fiber based on the delay difference and the total transmission length L.

Optionally, the second determining unit 804 may further include:

a sixth determining module 8041, configured to determine the dispersion coefficient of the to-be-tested optical fiber based on the following formulas:

$$D=\Delta t/(\Delta\lambda * L), \text{ and}$$

$$\Delta\lambda=\lambda 1-\lambda 2,$$

where D is a dispersion coefficient of the to-be-tested optical fiber at a wavelength position $(\lambda 1+\lambda 2)/2$, $\Delta t$ is the delay difference between the first OSC measurement signal and the second OSC measurement signal transmitted through the to-be-tested optical fiber, $\Delta\lambda$ is a wavelength difference between the first OSC measurement signal and the second OSC measurement signal, $\lambda 1$ is a wavelength of the first OSC measurement signal and is a known amount, $\lambda 2$ is a wavelength of the second OSC measurement signal and is a known amount, and L is the total transmission length of the to-be-tested optical fiber.

Optionally, the network device may further include:

a temporary storage unit 806, configured to temporarily store data of a communication service within a measurement period; and a second sending unit 807, configured to send the temporarily stored data of the communication service to the to-be-tested optical fiber after measurement ends.

Optionally, the network device may further include:

a third determining unit 808, configured to determine, based on a one-to-one correspondence between dispersion coefficients and optical fiber types of the to-be-tested optical fiber, an optical fiber type of the to-be-tested optical fiber corresponding to the dispersion coefficient of the to-be-tested optical fiber.

In this embodiment of the present invention, the network device temporarily stores the data of the communication service, so that a normal communication service is not affected, and a dispersion coefficient of an optical fiber is measured without service loss to further determine the optical fiber type of the to-be-tested optical fiber.

It may be clearly understood by persons skilled in the art that, for the purpose of convenient and brief description, for a detailed working process of the foregoing system, apparatus, and unit, refer a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of this application. The foregoing storage medium includes: any medium that can store program code, such as a USB flash drive, a removable hard disk, a read-only memory (ROM), a random-access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for measuring a dispersion coefficient of an optical fiber, comprising:
    sending, by a network device, a first optical supervisory channel (OSC) measurement signal and a second OSC measurement signal, wherein wavelengths of the first OSC measurement signal and the second OSC measurement signal are different;
    receiving, by the network device, the returned first OSC measurement signal and second OSC measurement signal, wherein the first OSC measurement signal is transmitted through a first optical fiber and a second optical fiber to return to the network device, the second OSC measurement signal is transmitted through the first optical fiber and the second optical fiber to return to the network device, the first OSC measurement signal is transmitted through the first optical fiber and the second optical fiber in opposite transmission directions, the second OSC measurement signal is transmitted through the first optical fiber and the second optical fiber in opposite transmission directions, and the first optical fiber and the second optical fiber are a to-be-tested optical fiber;
    determining, by the network device, a delay difference between the received first OSC measurement signal and second OSC measurement signal, wherein the delay difference is a difference between duration of the first OSC measurement signal and duration of the second OSC measurement signal being transmitted through the to-be-tested optical fiber; and
    determining, by the network device, a dispersion coefficient of the to-be-tested optical fiber based on the delay difference.

2. The method according to claim 1, wherein the determining, by the network device, a delay difference between the received first OSC measurement signal and second OSC measurement signal comprises:
    obtaining, by the network device, a first sending timestamp and a first receiving timestamp of the received first OSC measurement signal, and obtaining a second sending timestamp and a second receiving timestamp of the received second OSC measurement signal;
    determining, by the network device, first transmission duration and second transmission duration, wherein the first transmission duration is a difference between the first receiving timestamp and the first sending timestamp, and the second transmission duration is a difference between the second receiving timestamp and the second sending timestamp; and
    determining, by the network device, the delay difference based on the first transmission duration and the second transmission duration, wherein the delay difference is a difference between the first transmission duration and the second transmission duration.

3. The method according to claim 1, wherein the determining, by the network device, a delay difference between the received first OSC measurement signal and second OSC measurement signal comprises:
    obtaining, by the network device, a first sending moment and a first receiving moment of the received first OSC measurement signal, and obtaining a second sending moment and a second receiving moment of the received second OSC measurement signal;
    determining, by the network device, a first relative delay and a second relative delay, wherein the first relative delay is a difference between the first sending moment and the second sending moment, and the second relative delay is a difference between the first receiving moment and the second receiving moment; and
    determining, by the network device, the delay difference based on the first relative delay and the second relative delay, wherein the delay difference is a difference between the first relative delay and the second relative delay.

4. The method according to claim 1, wherein the determining, by the network device, a delay difference between the received first OSC measurement signal and second OSC measurement signal comprises:
    obtaining, by the network device, a first sending moment and a first receiving moment of the received first OSC measurement signal, and obtaining a second sending moment and a second receiving moment of the received second OSC measurement signal, wherein the first sending moment is the same as the second sending moment; and
    determining, by the network device, the delay difference based on the first receiving moment and the second receiving moment, wherein the delay difference is a difference between the first receiving moment and the second receiving moment.

5. The method according to claim 1, wherein before the determining, by the network device, a dispersion coefficient of the to-be-tested optical fiber based on the delay difference, the method further comprises:
    obtaining, by the network device, a total transmission length L of the to-be-tested optical fiber by using a preset optical fiber length measurement function; and
    the determining, by the network device, a dispersion coefficient of the to-be-tested optical fiber based on the delay difference comprises:
    determining, by the network device, the dispersion coefficient of the to-be-tested optical fiber based on the delay difference and the total transmission length L.

6. The method according to claim 5, wherein the determining, by the network device, the dispersion coefficient of the to-be-tested optical fiber based on the delay difference and the total transmission length L comprises:
determining, by the network device, the dispersion coefficient of the to-be-tested optical fiber based on the following formula:

$D=\Delta t/(\Delta \lambda * L)$, wherein $\Delta \lambda = \lambda 1 - \lambda 2$, D is a dispersion coefficient of the to-be-tested optical fiber at a wavelength position $(\lambda 1+\lambda 2)/2$, $\Delta t$ is the delay difference between the first OSC measurement signal and the second OSC measurement signal transmitted through the to-be-tested optical fiber, $\Delta \lambda$ is a wavelength difference between the first OSC measurement signal and the second OSC measurement signal, $\lambda 1$ is a wavelength of the first OSC measurement signal and is a known amount, $\lambda 2$ is a wavelength of the second OSC measurement signal and is a known amount, and L is the total transmission length of the to-be-tested optical fiber.

7. The method according to claim 1, wherein the method further comprises:
temporarily storing, by the network device, data of a communication service within a measurement period; and
sending, by the network device, the temporarily stored data of the communication service to the to-be-tested optical fiber after measurement ends.

8. The method according to claim 1, wherein the method further comprises:
determining, by the network device based on a one-to-one correspondence between dispersion coefficients and optical fiber types of the to-be-tested optical fiber, an optical fiber type of the to-be-tested optical fiber corresponding to the dispersion coefficient of the to-be-tested optical fiber.

9. A network device, comprising:
a computing hardware; and
a non-transitory computer-readable storage medium including computer-executable instructions executed by the computing hardware to perform operations comprising:
sending a first optical supervisory channel (OSC) measurement signal and a second OSC measurement signal, wherein wavelengths of the first OSC measurement signal and the second OSC measurement signal are different;
receiving the returned first OSC measurement signal and second OSC measurement signal, wherein the first OSC measurement signal is transmitted through a first optical fiber and a second optical fiber to return to the network device, the second OSC measurement signal is transmitted through the first optical fiber and the second optical fiber to return to the network device, the first OSC measurement signal is transmitted through the first optical fiber and the second optical fiber in opposite transmission directions, the second OSC measurement signal is transmitted through the first optical fiber and the second optical fiber in opposite transmission directions, and the first optical fiber and the second optical fiber are a to-be-tested optical fiber;
determining a delay difference between the received first OSC measurement signal and second OSC measurement signal, wherein the delay difference is a difference between duration of the first OSC measurement signal and duration of the second OSC measurement signal being transmitted through the to-be-tested optical fiber; and
determining a dispersion coefficient of the to-be-tested optical fiber based on the delay difference.

10. The network device according to claim 9, wherein the computing hardware is configured with computer-executable instructions to perform operations such that the determining a delay difference between the received first OSC measurement signal and second OSC measurement signal comprises:
obtaining a first sending timestamp and a first receiving timestamp of the received first OSC measurement signal, and obtaining a second sending timestamp and a second receiving timestamp of the received second OSC measurement signal;
determining first transmission duration and second transmission duration, wherein the first transmission duration is a difference between the first receiving timestamp and the first sending timestamp, and the second transmission duration is a difference between the second receiving timestamp and the second sending timestamp; and
determining the delay difference based on the first transmission duration and the second transmission duration, wherein the delay difference is a difference between the first transmission duration and the second transmission duration.

11. The network device according to claim 9, wherein the computing hardware is configured with computer-executable instructions to perform operations such that the determining a delay difference between the received first OSC measurement signal and second OSC measurement signal comprises:
obtaining a first sending moment and a first receiving moment of the received first OSC measurement signal, and obtaining a second sending moment and a second receiving moment of the received second OSC measurement signal;
determining a first relative delay and a second relative delay, wherein the first relative delay is a difference between the first sending moment and the second sending moment, and the second relative delay is a difference between the first receiving moment and the second receiving moment; and
determining the delay difference based on the first relative delay and the second relative delay, wherein the delay difference is a difference between the first relative delay and the second relative delay.

12. The network device according to claim 9, wherein the computing hardware is configured with computer-executable instructions to perform operations such that the determining a delay difference between the received first OSC measurement signal and second OSC measurement signal comprises:
obtaining a first sending moment and a first receiving moment of the received first OSC measurement signal, and obtaining a second sending moment and a second receiving moment of the received second OSC measurement signal, wherein the first sending moment is the same as the second sending moment; and
determining the delay difference based on the first receiving moment and the second receiving moment, wherein the delay difference is a difference between the first receiving moment and the second receiving moment.

13. The network device according to claim 9, wherein the operations further comprises:
   obtaining a total transmission length L of the to-be-tested optical fiber by using a preset optical fiber length measurement function; and
   determining the dispersion coefficient of the to-be-tested optical fiber based on the delay difference and the total transmission length L.

14. The network device according to claim 13, wherein the computing hardware is configured with computer-executable instructions to perform operations such that the determining the dispersion coefficient of the to-be-tested optical fiber based on the delay difference and the total transmission length L comprises:
   determining the dispersion coefficient of the to-be-tested optical fiber based on the following formulas:

$D=\Delta t/(\Delta\lambda*L)$, and $\Delta\lambda=\lambda 1-\lambda 2$, wherein D is a dispersion coefficient of the to-be-tested optical fiber at a wavelength position $(\lambda 1+\lambda 2)/2$, $\Delta t$ is the delay difference between the first OSC measurement signal and the second OSC measurement signal transmitted through the to-be-tested optical fiber, $\Delta\lambda$ is a wavelength difference between the first OSC measurement signal and the second OSC measurement signal, $\lambda 1$ is a wavelength of the first OSC measurement signal and is a known amount, $\lambda 2$ is a wavelength of the second OSC measurement signal and is a known amount, and L is the total transmission length of the to-be-tested optical fiber.

15. The network device according to claim 9, wherein the operations further comprises:
   temporarily storing data of a communication service within a measurement period; and
   sending the temporarily stored data of the communication service to the to-be-tested optical fiber after measurement ends.

16. The network device according to claim 9, wherein the operations further comprises:
   determining, based on a one-to-one correspondence between dispersion coefficients and optical fiber types of the to-be-tested optical fiber, an optical fiber type of the to-be-tested optical fiber corresponding to the dispersion coefficient of the to-be-tested optical fiber.

17. A network device, comprising:
   an optical module, a processor, a memory, an output interface, an input interface, and a bus, wherein
   the optical module, the processor, the memory, the output interface, and the input interface are connected by using the bus;
   the optical module is configured to generate and process a measurement signal;
   the processor is configured to: invoke a program for measuring a dispersion coefficient of an optical fiber from the memory, execute the program, and control the optical module to generate and process the measurement signal;
   the memory is configured to store data of a communication service within a measurement period and the program for measuring a dispersion coefficient of an optical fiber, and the memory is further configured to store the received measurement signal;
   the output interface is configured to send the measurement signal generated by the optical module to a connected optical fiber;
   the input interface is configured to receive the measurement signal returned from the connected optical fiber; and
   the processor invokes an instruction of the program in the memory, so that the network device performs the method for measuring a dispersion coefficient of an optical fiber according to of claim 1.

* * * * *